(No Model.) 2 Sheets—Sheet 1.

C. H. TOWNSEND.
KITCHEN TABLE.

No. 246,695. Patented Sept. 6, 1881.

Witnesses
Frank A. Brooks
H. F. Dexter

Inventor
Charles H. Townsend
By Dewey & Co.
Attys (No Model.)  2 Sheets—Sheet 2.

C. H. TOWNSEND.
KITCHEN TABLE.

No. 246,695.  Patented Sept. 6, 1881.

Witnesses
Frank A. Brooks
H. F. Dexter

Inventor
Charles H. Townsend
By Dewey & Co
Attys

UNITED STATES PATENT OFFICE.

CHARLES H. TOWNSEND, OF OAKLAND, CALIFORNIA.

KITCHEN-TABLE.

SPECIFICATION forming part of Letters Patent No. 246,695, dated September 6, 1881.

Application filed July 30, 1880. (No model.)

*To all whom it may concern:*

Be it known that I, CHARLES H. TOWNSEND, of Oakland, county of Alameda, and State of California, have invented an Improved Kitchen-Table; and I hereby declare the following to be a full, clear, and exact description thereof.

My invention relates to certain improvements in that class of articles of furniture known as "kitchen-tables;" and my improvements refer more particularly to a similar device, for which Letters Patent No. 176,711 were granted to me on the 25th of April, 1876, and consist in the combination of devices hereinafter explained and claimed, the whole being combined as is more fully described in the accompanying drawings, in which—

Figure 1:
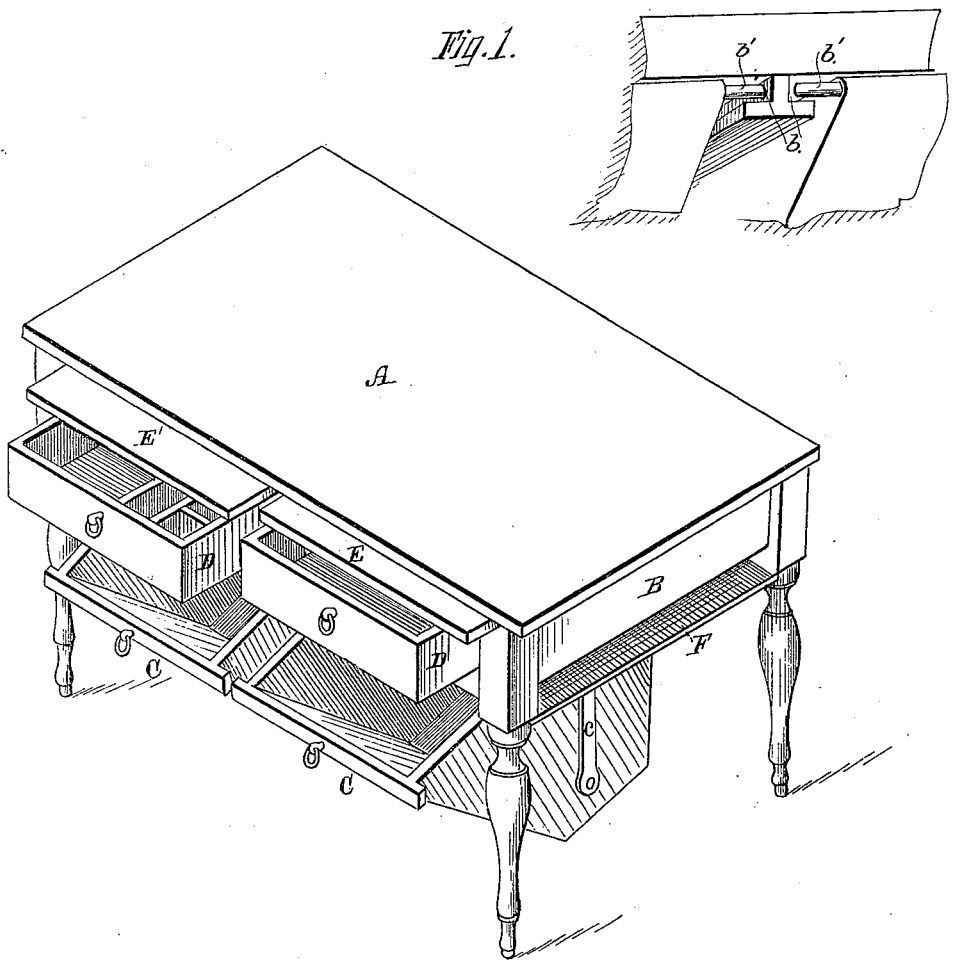
Figure 2:
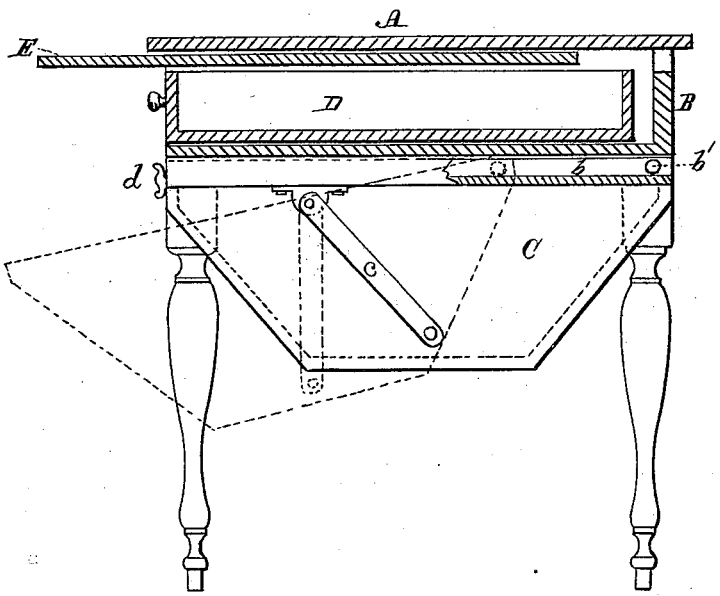

Figure 1 is a perspective view. Fig. 2 is a transverse section. Fig. 3 is an enlarged view of the lugs and grooves.

A represents the table, which is made in the ordinary form, with the usual bracing-strips B around it at a suitable distance below the table-top. Below this brace are placed two bins or drawers, C C, arranged to be drawn out separately. In my former patent, hereinbefore referred to, these bins slid in grooves after the manner of drawers. The bins are made in a form semicircular in one direction, but, instead of operating as drawers, are hung on links c, so that they are adapted to swing downward and outward, the links being swiveled to the lower edge of the center of the bin, but pivoted to the table or brace forward of the center of the bins, as shown.

Guides or grooves $b$ are formed in the under side of the table, and lugs $b'$, on the upper rear sides of the bins, move in these guides as the bin is moved forward and back. The rear edge of the bin is therefore held so that it moves in a horizontal plane only, while the front end moves both downward and outward, the lugs guiding the rear end of the bin so it cannot jam.

This construction is much preferable to that which involves drawing the bin out, since when it moves as a drawer it is apt to stick or jam when full, owing to the friction on the sides of the guides.

In my improved bin, by turning the latch $d$ the bin will swing forward on its links so its contents are accessible, and by pushing back it swings again into position, where it may be secured by the latch $d$. To move it forward comparatively little exertion is required, since it opens automatically; and to move it back to close it very slight force is required, there never being any danger of jamming or catching.

Above the braces are drawers D D, suitably provided with compartments for knives, spoons, spices, and other small articles used about the kitchen.

In my former patent I showed a kneading-board directly under the top board, which when closed in was entirely out of the way, similar to a drawer. I find it preferable to make two independent boards, one upon which bread may be kneaded, and another upon which meat may be cut or chopped, bread cut, &c.

The sliding board E is intended for kneading bread, and the board E' for cutting meat, &c. Within the same space, therefore, articles for the two purposes may be kept. The boards will slide from either side of the table.

At each end of the table, under the bracing-strips B, are shelves F, upon which flat-irons or similar heavy articles may be placed out of the way.

This whole table is very convenient and simple, and will be found very useful in the kitchen.

Having thus described my invention, what I claim as new, and desire to secure by Letters Patent, is—

The table A, provided with grooves $b$, in combination with the flour bins or boxes C C and links $c$, the bins having lugs $b'$ to fit the grooves $b$, whereby the bins are swung in or out and liability of jamming or binding is avoided, substantially as herein set forth.

In witness whereof I have hereunto set my hand.

CHARLES H. TOWNSEND.

Witnesses:
 FRANK A. BROOKS,
 S. H. NOURSE.